Patented Aug. 25, 1953

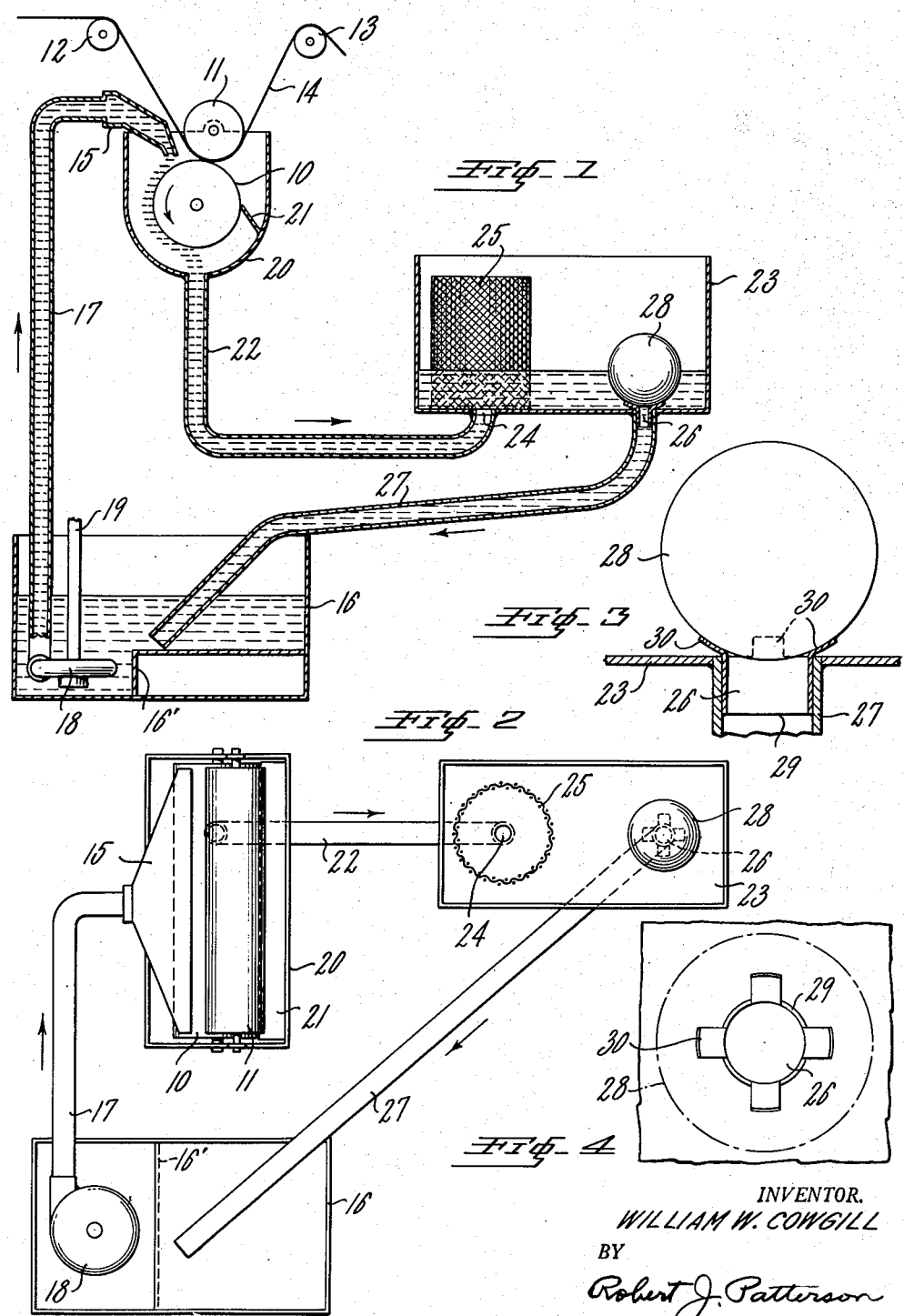

2,649,758

UNITED STATES PATENT OFFICE 2,649,758

COATING MACHINE WITH CIRCULATING SYSTEM

William W. Cowgill, Fairfield, Conn., assignor to United States Rubber Company, New York, N. Y., a corporation of New Jersey Application December 5, 1950, Serial No. 199,222

12 Claims. (Cl. 118—602)

This invention relates to a circulating system for circulating a coating liquid in a machine for coating paper or the like and in particular relates to a circulating system which will circulate the liquid without undue foaming thereof.

In the coating of paper or the like, it is common practice to pass the paper past and in contact with a rotating roller to which the coating liquid has been applied. The liquid is generally applied to the roller by means of an elongated nozzle placed adjacent the roller which allows the liquid to flow onto the roller. The coating liquid is supplied from a reservoir beneath the roller and is forced through a conduit connecting the nozzle and the reservoir by means of a pump. Only a small portion of the coating liquid supplied to the roller actually stays with the roller to be applied to the paper. The excess coating liquid falls into a trough below the roller and drops by gravity through a continuous return conduit from the bottom of the trough into the reservoir to be recirculated.

Many of the coating liquids used in coating paper or the like contain soap or other ingredients which when agitated in the presence of air will foam. This is particularly true of coating compositions comprising an aqueous dispersion of rubbery and/or resinous material containing an emulsifying agent, such as soap, which with water forms a low surface tension liquid which normally tends to foam excessively when agitated in the presence of air. In using these coating fluids in a coating machine this problem of the foaming of the fluid becomes quite acute. As the excess coating fluid passes down the conduit between the trough and the reservoir, the fluid has a vortical or whirling action which allows air to be mixed with the fluid with the result that there is considerable foaming of the fluid. The length of the drop of the fluid between the trough and the reservoir is an important factor, as the shorter the drop the less foaming there will be. However, it is not usually practical because of space limitations to provide the reservoir close to the trough in order to shorten the drop.

It is one object, therefore, of the instant invention to provide a circulating system which will greatly reduce the foaming of the fluid as it passes from the trough to the reservoir.

Another object of the invention is to provide a circulating system which is simple and inexpensive to construct and which may be easily applied to existing machines.

A still further object of the invention is to provide an anti-foaming device which may be used in various circulating systems to prevent foaming of the circulating liquid.

In the present invention, the continuous return conduit of the conventional circulating system is replaced by a surge tank placed as close to the trough in a vertical direction as is possible, but which may be spaced from the trough in a horizontal direction. A conduit is provided connecting the surge tank with the trough and a second conduit is provided connecting the surge tank with the reservoir.

In order to eliminate any foam formed during the passage of the liquid from the trough to the surge tank, a screen is provided in such a position that liquid entering the surge tank will pass therethrough on its way to the second conduit. The effect of the screen is to break up the individual bubbles of foam which may have been formed in the passage of the liquid from the trough to the surge tank. To further increase the effectiveness of the screen in breaking up the foam, the screen may be coated with a polymeric silicone, it having been found that polymeric silicone used in this manner has a remarkable effect in breaking up any foam that may have been formed.

In order to prevent foaming of the liquid as it passes from the surge tank to the reservoir, a float valve is provided in the tank for the second discharge conduit so that a predetermined level of liquid will be maintained in the surge tank at all times. By maintaining a sufficient level of liquid in the surge tank above the entrance to the second conduit, the liquid passing down the second conduit will not have a chance to swirl and mix with the air, with the result that no foaming will occur during the passage of the fluid from the surge tank to the reservoir. The liquid above the entrance to the second conduit acts as a seal to prevent air from entering the conduit and also insures that the conduit is full of liquid at all times.

It is, therefore, possible by using the present invention to position the reservoir a considerable distance below the applicator roll of a coating machine without undue foaming of the coating fluid on its return from the coating or applicator roll to the reservoir. Such disposition enables installation of the non-foaming circulating system appurtenant to a coating machine in a situation where space limitations are exceedingly stringent.

Other objects and advantages of the present invention will become apparent from the following description when taken in conjunction with the accompanying drawing, wherein:

Fig. 1 is a vertical sectional view of a typical embodiment of my invention,

Fig. 2 is a plan view of the apparatus of Fig. 1,

Fig. 3 is a sectional view showing details of the float seat, and

Fig. 4 is a plan view showing the details of the float seat.

Referring to Fig. 1 of the drawing, a coating roll 10, backing roll 11 and guide rolls 12 and 13 of a conventional paper coating machine are disclosed for the purpose of illustrating the application of the present invention. A continuous sheet of paper 14 is fed past the coating roll 10 and is held in contact with the coating roll by the backing roll 11. Rolls 12 and 13 merely serve as guides for the paper. The paper is fed at a linear speed equal to the peripheral speed of the coating roll 10.

Coating liquid is supplied to the coating roll 10 by means of an elongated nozzle 15 positioned adjacent to the roll. The coating liquid is pumped from a reservoir 16 through a conduit 17 to the nozzle 15 by a pump 18. Pump 18 is driven by a motor (not shown) through a shaft 19. A partition 16' provides a sump for the pump at one end of the reservoir 16. Coating liquid emitted from the nozzle 15 flows onto the coating roller 10. Only a small portion of the liquid sticks to the roller 10 to be applied to the paper. The excess liquid drops into a trough 20 positioned below the roller 10. To insure that a uniform layer of the liquid is applied to the roller 10, and to remove any excess liquid from the roll 10, a doctor knife 21 is provided at one side of the trough 20. Any liquid removed by the knife 21 also drops into the trough 20.

The liquid which drops into the trough 20 flows by gravity through a conduit 22 to a surge tank 23. The liquid enters the tank at the bottom thereof through an inlet orifice 24 provided therefor. Surrounding the orifice 24 is a screen 25. The function of the screen is to break up any bubbles of foam which may have been formed prior to the entry of the liquid into the surge tank 23. A 40 to 60 mesh screen is preferred for this purpose.

It has been found that if the screen 25 is coated with a polymeric dihydrocarbon silicone, the effectiveness of the screen in breaking up the foam is remarkably increased. While it was known that polymeric dihydrocarbon silicones are effective as anti-foaming agents when admixed with organic liquids exhibiting objectionable foaming tendencies, I have found that by coating the wires of screen with such a silicone its effect is greatly increased as compared with adding the silicone directly to the coating fluid. In fact, I have found that adding the same amount of silicone directly to the fluid as I use in coating the screen, has little or no effect in preventing foaming of the particular aqueous dispersions with which I am concerned. I have found that when the silicone is added directly to the coating composition including an aqueous dispersion of rubbery and/or resinous material, the silicone definitely adversely affects the properties of the coating composition. Apparently the small particles of the silicone break the surface tension of the coating composition in their vicinity to repel the coating composition so that when the composition is applied to a sheet of paper, the coating will not be smooth but will have a multitude of spots where the coating composition has been repelled by the particles of silicone contained therein. I have found it necessary, however, to recoat the screen with the silicone at spaced intervals, the silicone apparently being gradually removed from the screen by the erosive effect of the passage of the fluid therethrough. Such periodic renewal of the silicone coating can easily be achieved by simply removing the screen, dipping it in a cleaning solution if desired, and immersing the clean screen in a bath of the silicone and allowing the excess to drain off. I have found, however, that the coating of silicone is effective for a considerable period of time. In fact I have left a screen coated with the silicone in a stream of aqueous coating composition for as long as 8 hours and have obtained the same elimination of foam at the end of the 8 hour period as at the beginning of the period.

The silicone used for coating the screen preferably is a liquid polymeric dihydrocarbon silicone, especially a di-lower alkyl silicone-like dimethyl silicone, the polymerization of which has been stopped at a point at which it is non-volatile at ordinary temperatures but is liquid at such temperatures. Silicone liquids suitable for this purpose are illustrated in U. S. Patent No. 2,375,007. The silicone liquid preferably is insoluble in water since otherwise it would be removed from the screen too rapidly by the circulating aqueous coating liquid. Extremely satisfactory results have been achieved using the silicone liquid sold as "DC Anti Foam A."

Spaced from orifice 24 is a second orifice 26 to which is connected a conduit 27 which discharges into reservoir 16. The surge tank 23 is provided with a float 28 which is disclosed in the drawing as a spherical rubber ball, though it is obvious that other types of floats could be used. The function of the float is to regulate the level of the liquid in the surge tank 23. When the level of the liquid in the surge tank drops, the float 28 covers the orifice 26 and thereby prevents the liquid from flowing from the tank. As the level of the liquid in the tank increases, the float rises allowing more liquid to be discharged. In this manner, it is insured that there will always be a predetermined amount of liquid in the surge tank above the orifice 26. This is an important feature of the invention, for by keeping a sufficient level of liquid above the orifice 26 at all times, air is prevented from being mixed with the coating liquid and therefore undesirable foaming is eliminated. This is due to the fact that the volume of liquid above the orifice insures that the discharge conduit 27 is always full of liquid so that undesirable vortical or whirling action of the liquid as it passes down the conduit will not occur.

The float 28 may be made to completely close off the orifice 26 or as disclosed in the drawing, a special seat may be provided to keep the float from completely sealing off the orifice 26. Fig. 3 discloses the type of seat which may be used for this purpose. In this embodiment, the seat consists of a sleeve 29 which fits into the end of the conduit 27. Four angularly spaced tabs 30 are provided on the end of the sleeve and these tabs are bent outwardly so as to conform approximately to the outside surface of float 28 as shown in Fig. 3. The float 28 engages these tabs and is prevented from completely sealing the orifice 26, so that some liquid may at all times pass between the tabs into the conduit 27. The purpose of this construction is to prevent the float from being held too tightly by the suction created by the liquid passing down the conduit 27. If the float were allowed to completely seal the orifice 26, the suction would hold the float in a closed position until the buoyant force of the float was sufficient to overcome the suction. To insure that the float would have sufficient buoyancy, the float would have to be made objectionably large and moreover would behave erratically. By preventing the float from completely seating constant leakage of liquid past the float prevents creation of a large suction force; therefore a much smaller float can be used and the float is much more sensitive to an increase in the liquid level in the tank and consequently more effective in its action.

As shown in Fig. 1, the surge tank 23 may be positioned to the side of the coating machine when space limitations so dictate. It is also desirable to position the surge tank 23 as closely as possible in a vertical direction to the bottom of the trough so that the greater portion of the return of the fluid will be by way of conduit 27. The reason for this is that nearly all of the foaming occurs in conduit 22 so that the greater the length in a vertical direction of conduit 22, the greater the foaming and the larger the amount of foam that must be broken up by the screen 25. No foaming will occur in conduit 27, so its length is unimportant and it may be made as long as desired.

In initially operating a coating machine incorporating the present invention, the reservoir 16 is first filled with coating liquid. The pump 18 is started and the coating liquid is pumped up through the conduit 17 to the nozzle 15 as indicated by the arrow in Figs. 1 and 2. The nozzle 15 directs the liquid onto the applicator roll 10. Excess coating liquid drops into trough 20 and passes down the conduit 22. As the liquid passes from the nozzle 15 over the applicator roll 10 and down the conduit 22, the liquid is necessarily agitated in the presence of air and therefore foaming of the liquid occurs at this point in its passage through the system. This foaming is particularly acute in the conduit 22 as the liquid tends to whirl around the inner surface of the conduit rather than completely fill the conduit. From the conduit 22, the liquid passes into the surge tank 23 through the orifice 24. In passing from the orifice 24 to the orifice 26, the liquid must pass through the silicone coating screen 25. The screen 25 breaks up the bubbles of foam so that the liquid in the tank outside of the screen which eventually passes down the conduit 27 is foam free.

Initially the surge tank 23 is empty and the float 28 seals or substantially seals the discharge conduit 22 so that the liquid is prevented from immediately passing out of the surge tank 23. The level of the liquid soon rises in the tank and at a predetermined level, the float 28 rises allowing the liquid to pass freely down the conduit 27 back to the reservoir 16. As long as the pump 18 is operated and as long as a sufficient supply of liquid is maintained in the reservoir 16, the float 28 will maintain a predetermined level of liquid in the surge tank 23. By thus maintaining a substantial level of liquid above the entrance to the conduit 27, the liquid which flows down the conduit will not mix with the air or be agitated, since the liquid above the entrance of the conduit 22 acts as a seal to prevent air from mixing with the liquid as it enters the conduit and also insures that the conduit is completely filled with liquid so that no foaming may occur. The liquid, therefore, will pass without foaming down the conduit 22 into the reservoir 16 to be recirculated.

It is to be understood that the above-described embodiment of the invention is for the purpose of illustration only and that modifications and changes can be made therein without departing from the scope and spirit of the invention.

Having thus described my invention, what I claim and desire to protect by Letters Patent is:

1. In combination, a coating machine having an applicator roll and a circulating system for circulating a coating liquid, said system comprising, a nozzle for applying coating liquid to the applicator roll, a reservoir for the liquid positioned beneath the nozzle, a conduit connecting the nozzle with the reservoir, means for pumping the liquid from the reservoir through the conduit to the nozzle, a trough beneath the applicator roll for receiving excess coating liquid, a surge tank positioned beneath the trough but above the reservoir, a conduit connecting the bottom of the trough and the surge tank, a second conduit connecting the bottom of the surge tank and the reservoir, and a float valve in the surge tank so associated with the second conduit as to regulate the flow of the liquid from the surge tank through the second conduit whereby a sufficient level of liquid will be maintained in the tank above the second conduit to prevent air from mixing with the liquid as it enters the second conduit and passes to the reservoir and thereby prevent foaming of the liquid.

2. In combination, a coating machine having an applicator roll and a circulating system for circulating a coating liquid, said system comprising, a nozzle for applying coating liquid to the applicator roll, a reservoir for the liquid positioned beneath the nozzle, a conduit connecting the nozzle with the reservoir, means for pumping the liquid from the reservoir through the conduit to the nozzle, a trough beneath the applicator roll for receiving excess coating liquid, a surge tank positioned beneath the trough but above the reservoir, a conduit connecting the bottom of the trough and the surge tank, a screen in the surge tank surrounding the entrance of the conduit with the surge tank, a second conduit connecting the bottom of the surge tank and the reservoir, and a float valve in the surge tank so associated with the second conduit as to regulate the flow of the liquid from the surge tank whereby a sufficient level of liquid will be maintained in the tank above the second conduit to prevent air from mixing with the liquid as it enters the second conduit and passes to the reservoir and thereby prevent foaming of the liquid.

3. In combination, a coating machine having an applicator roll and a circulating system for circulating a coating liquid, said system comprising, a nozzle for applying coating liquid to the applicator roll, a reservoir for the liquid positioned beneath the nozzle, a conduit connecting the nozzle with the reservoir, means for pumping the liquid from the reservoir through the conduit to the nozzle, a trough beneath the applicator roll for receiving excess coating liquid, a surge tank positioned beneath the trough but above the reservoir, a conduit connecting the bottom of the trough and the surge tank, a screen coated with a water-insoluble polymeric dihydrocarbon silicone in the surge tank surrounding the entrance of the conduit with the surge tank, a second conduit connecting the bottom of the surge tank and the reservoir, and a float valve in the surge tank so associated with the second conduit as to regulate the flow of the liquid from the surge tank through the second conduit whereby a sufficient level of liquid will be maintained in the tank above the second conduit to prevent air from mixing with the liquid as it enters the second conduit and passes to the reservoir and thereby prevent foaming of the liquid.

4. In combination, a coating machine having an applicator roll and a circulating system for circulating a coating liquid, said system comprising, a nozzle for applying coating liquid to the applicator roll, a reservoir for the liquid positioned beneath the nozzle, a conduit connecting the nozzle with the reservoir, means for pumping the liquid from the reservoir through the conduit to the nozzle, a trough beneath the applicator roll for receiving excess coating liquid, a surge tank positioned beneath the trough but above the reservoir, a conduit connecting the bottom of the trough and the surge tank, a second conduit connecting the bottom of the surge tank and the reservoir, a spherically shaped float in the surge tank adapted to seal the second conduit when the level of the liquid in the surge tank drops below a predetermined level whereby a sufficient level of the liquid will be maintained in the tank above the second conduit to prevent air from mixing with the liquid as it enters the second conduit and passes to the reservoir and thereby prevent foaming of the liquid.

5. In combination, a coating machine having an applicator roll and a circulating system for circulating a coating liquid, said system comprising, a nozzle for applying coating liquid to the applicator roll, a reservoir for the liquid positioned beneath the nozzle, a conduit connecting the nozzle with the reservoir, means for pumping the liquid from the reservoir through the conduit to the nozzle, a trough beneath the applicator roll for receiving excess coating liquid, a surge tank positioned beneath the trough but above the reservoir, a conduit connecting the bottom of the trough and the surge tank, a second conduit connecting the bottom of the surge tank and the reservoir, a spherically shaped float in the surge tank adapted to seat over the entrance of the second conduit with the tank, whereby a sufficient level of liquid will be maintained in the tank above the second conduit to prevent air from mixing with the liquid as it enters the second conduit and passes to the reservoir and thereby prevent foaming of the liquid and means for preventing the float from completely sealing the second conduit whereby the float will be more sensitive to a change in the level of the liquid in the surge tank.

6. In a circulating system for circulating a coating liquid in a coating machine, the combination comprising, a tank, an intake orifice in the bottom of the tank, a screen surrounding said intake orifice, said screen being coated with water-insoluble polymeric dihydrocarbon silicone, a discharge orifice in the bottom of said tank spaced from said intake orifice, a float in said tank, said float being adapted to seat over said discharge orifice when the level of liquid in said tank drops below a predetermined level.

7. In a circulating system for circulating a coating fluid in a coating machine, the combination comprising, a tank, an intake orifice in the bottom of the tank, a screen surrounding said intake orifice, said screen being coated with water-insoluble polymeric dihydrocarbon silicone, a discharge orifice in the bottom of the tank spaced from said intake orifice, a float in said tank adapted to seat over said discharge orifice when the level of the liquid drops below a predetermined level, and means for preventing the float from completely sealing the discharge orifice.

8. In a circulating system for circulating a coating liquid in a coating machine, the combination comprising, a tank, an intake orifice in the bottom of the tank, a screen surrounding said intake orifice, said screen being coated with water-insoluble polymeric dihydrocarbon silicone, and a discharge orifice in the bottom of said tank spaced from said intake orifice.

9. In combination, a coating machine having an applicator roll and a circulating system for circulating a coating liquid, said system comprising, a nozzle for applying a coating liquid to the applicator roll, a reservoir for the liquid positioned beneath the nozzle, a conduit connecting the nozzle with the reservoir, means for pumping the liquid from the reservoir through the conduit to the nozzle, a trough beneath the applicator roll for receiving excess coating liquid, a return circuit connecting the trough with the reservoir, and a screen coated with water-insoluble polymeric dihydrocarbon silicone in said return circuit for breaking up the bubbles of foam.

10. In combination, a coating machine having an applicator roll and a circulating system for circulating a coating liquid, said system comprising a reservoir for the coating liquid positioned a substantial distance below the applicator roll, means for conveying the liquid from the reservoir to the applicator roll, means below the applicator roll for collecting excess coating liquid, a surge tank positioned below the collecting means but above the reservoir, a first conduit connecting the collecting means and the surge tank, a screen disposed around the inlet end of the first conduit for breaking foam in the entering liquid, a second conduit connecting the surge tank and the reservoir and leaving the surge tank at a point spaced from said screen, and float valve means for controlling the exit of the liquid from the surge tank through the second conduit for maintaining a predetermined level of liquid in the surge tank and for insuring that the second conduit is at all times filled with a gas-free column of liquid.

11. In combination, a coating machine having an applicator roll and a circulating system for circulating a coating liquid, said system comprising a reservoir for the coating liquid positioned a substantial distance below the applicator roll, means for conveying liquid from the reservoir to the applicator roll, means below the applicator roll for collecting excess coating liquid, a surge tank positioned below the collecting means and above the reservoir, a first conduit connecting said collecting means and the surge tank, a screen disposed around the inlet end of the first conduit for breaking foam in the entering liquid, said screen being coated with water-insoluble liquid polymeric dihydrocarbon silicone, a second conduit connecting the surge tank and the reservoir and leaving said surge tank at a point spaced from said screen, and float valve means controlling the exit of liquid from said surge tank through said second conduit for maintaining a predetermined level of liquid in the surge tank and for insuring that said second conduit is at all times filled with a gas-free column of liquid.

12. In combination, a coating machine having an applicator roll and a circulating system for circulating a coating liquid, said system comprising a reservoir for the coating liquid positioned a substantial distance below the applicator roll, means for conveying liquid from the reservoir to the applicator roll, means below the applicator roll for collecting excess coating liquid, a surge tank positioned below the collecting means and above the reservoir, a first conduit connecting the collecting means and the surge tank, a screen disposed around the inlet end of the first conduit for breaking foam in the entering liquid, a second conduit connecting the surge tank and the reservoir and leaving the surge tank at a point spaced from said screen, and float valve means controlling the exit of liquid from the surge tank through the second conduit for maintaining a predetermined level of liquid in said surge tank and for insuring that said second conduit is at all times filled with the gas-free column of liquid, the float valve means being so arranged as to allow a relatively small flow of liquid from the surge tank into the second conduit even when the float is seated whereby the excessive suction which would otherwise be developed and which would hold the float closed is prevented and whereby the responsiveness of the float to a rise in liquid level in the surge tank is greatly increased.

WILLIAM W. COWGILL.

References Cited in the file of this patent

UNITED STATES PATENTS

| Number | Name | Date |
|---|---|---|
| 2,438,929 | Leaf | Apr. 6, 1948 |
| 2,545,445 | Chatterton | Mar. 20, 1951 |